Jan. 31, 1939. E. P. LOPPACKER 2,145,400
VACUUM TUBE ELECTRODE
Original Filed Nov. 28, 1936
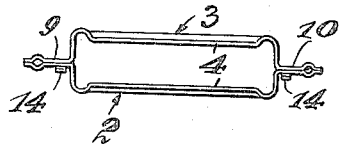
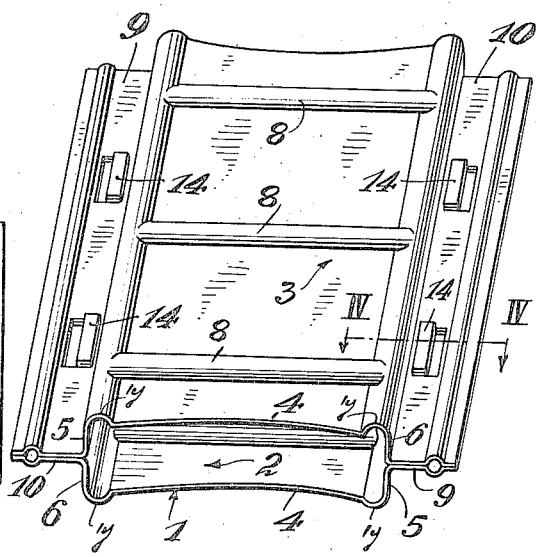
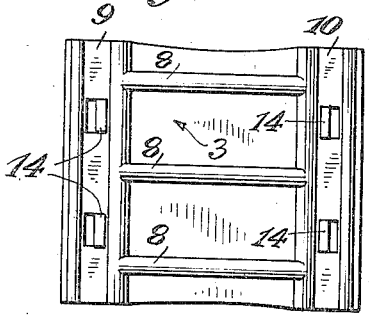
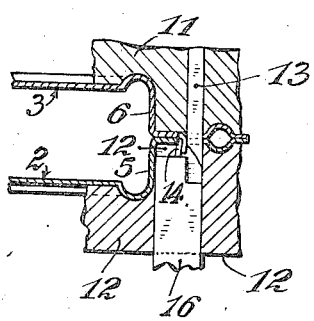
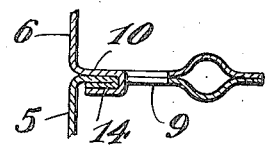
INVENTOR.
Everett P. Loppacker
BY Ramsey, Kent, Chisholm & Lutz
his ATTORNEYS Patented Jan. 31, 1939

2,145,400

UNITED STATES PATENT OFFICE 2,145,400

VACUUM TUBE ELECTRODE

Everett P. Loppacker, Verona, N. J., assignor to Albert Loppacker, Bloomfield, N. J.

Application November 28, 1936, Serial No. 113,109
Renewed December 13, 1938

2 Claims. (Cl. 250—27.5)

This invention relates to an electrode for space discharge electrical devices of the type used for amplifying and/or rectifying alternating currents. Such devices are commonly referred to as "vacuum tubes" and hence the term "vacuum tube" will be used herein, although it is an expression which is rather loose from a scientific standpoint. More particularly, the invention relates to a tubular anode formed from two sections of stamped sheet metal which are secured together.

One of the prime problems in the manufacture of vacuum tubes is to produce tubes which will not have erratic or undesirable operating characteristics. Examples of such characteristics are circuit unbalance produced by the tube, and noisy operation. The greater the amplification, the more difficult it is to prevent such undesirable characteristics; and with the increased amplifying power of tubes which has been achieved in the last few years, the problem of providing satisfactory tube structures has become increasingly difficult. Vacuum tube anodes are heat treated before the tube is completed, and in operation the tube parts are heated and cooled and often are subjected to mechanical vibration. Thus the anodes are subjected to various influences which tend to cause flexing or shifting of the parts, and such effects make for erratic and unsatisfactory operation.

The present invention is applied to an anode having two sheet metal halves which are made with their edge portions formed into outwardly projecting flanges; and the halves are assembled with the flanges in face-to-face contact. Formerly, the two halves were fastened together by temporarily clamping them in assembled relation and then piercing the contacting flanges with diamond-shaped punches. Each punch produced a pair of projecting two-layer metal fingers, and these fingers were bent longitudinally of the flanges in opposite directions so as to clamp or "stake" the two halves together. Before vacuum tube operating requirements became so rigorous, this was a satisfactory method of securing the two halves of the electrode, but to meet present day circuit requirements spot welding of the parts had to be resorted to in order to produce tubes that were sufficiently quiet. Structurally and electrically spot welding is satisfactory, but the time and expense involved are undesirably high for present day, low cost, high speed production.

The general object of the present invention is to provide a vacuum electrode structure having the parts staked together in a manner which will produce a tube sufficiently quiet and stable to meet present day operating requirements.

Another object is to provide a tubular anode fabricated from a plurality of sheet metal parts so staked together as to give improved strength and fixedness to the assembly.

Fig. I of the drawing is an enlarged isometric view of a complete electrode embodying the present invention.

Fig. II is a top plan view of the same electrode, on a reduced scale.

Fig. III is an elevation of the same electrode, on the same scale as Fig. II.

Fig. IV is greatly enlarged detail section, taken approximately on the line 4—4 of Fig. I.

Fig. V is an enlarged sectional view illustrating the staking operation.

The electrode has a tubular body 1, of elongated rectangular cross section, fabricated from two duplicate pieces of stamped sheet metal 2 and 3. Each of the pieces 2 and 3 is stamped with a portion 4 which forms one long side of the tubular body, and with portions 5 and 6 each of which forms one half of a short side of the tubular body. The portions 5 and 6 are connected to portions 4 by arcuate channels 7; and strengthening ribs 8 (three for each of the pieces 2 and 3) connect the two channels 7, 7 of each stamped piece.

The edges of the stamped pieces terminate in flanges 9 and 10 which extend longitudinally of the tubular body 1 and project outwardly from the vertical walls 5, 6. As shown, the stampings 2 and 3 are assembled with each of the flanges 9 and 10 in face-to-face contact with another such flange of the other stamping.

In manufacture, the stampings 2 and 3 are temporarily clamped together by die members 11 and 12 (Fig. V). A piercing member 13 of elongated rectangular cross section is positioned with its long cross sectional axis extending longitudinally of the flanges 9 and 10. This piercing member is forced through the contacting flanges 9 and 10 and strikes out a double-layer fin of metal 14. As shown in Fig. I (for example) this fin is of rectangular form; and one long and two short edges of the fin are severed from the contacting flanges 9 and 10, while the second long edge is left integral with the flanges 9 and 10. A clinching tool 16 bends the free edge of the fin toward the tubular body 1 and clinches it against one of the flanges 9 or 10, as best shown in Fig. IV, the layers of the fin being in close contact with each other, and one of the layers in close contact with the flange. If desired the length of the fin may be such that its free edge when laid down actually abuts the adjacent vertical wall of the tubular member, but at any rate it will be such that the free edge preferably comes fairly close to such vertical wall.

It is highly desirable that vacuum tube electrodes occupy a minimum of excess space in the tube, and hence flanges 9 and 10 do not project far from the tubular body 1. However, the staking of the present invention utilizes such a large amount of the available metal in the flanges 9 and 10 that a reliable and satisfactory connection is realized.

The hole punched in the staking operation tends to weaken the structure at this point. But when, in accordance with the present invention, the punched-out metal is bent towards the axis of the tubular body, and laid down on the flange with its forward edge at or close to the line of junction between the flange and the vertical wall from which the flange extends, it is obvious that the flange will be reinforced along that line and the removal of metal because of the staking thereby substantially compensated for. The result is that tendency for the parts of the tube to separate at the seam 15 is greatly diminished, between flanges 9, 10, and the parts are held against shifting and arching and other distortion under heat treatment of the electrode and subsequent heating and cooling in service.

With the prior staking method the fins were bent in a line parallel to the axis of the tubular body. Consequently there was no compensating reinforcement along the line of the seam, but the weakness resulting from the punch holes had its full effect.

What is claimed is:

1. An electrode comprising a tubular body the wall of which is discontinuous along a line longitudinally of the body, the edges of the tube along said line being formed with out-turned flanges held in face-to-face relation by a plurality of two-ply tongues spaced longitudinally of the body and punched out of both flanges with roots spaced relatively closely to said longitudinal line and bent to lie closely against one of the flanges and extend in a direction transverse to said line with their free ends at or closely adjacent to the wall of the tube.

2. An electrode comprising a tubular body the wall of which is discontinuous along a line longitudinally of the body, the edges of the tube along said line being formed with out-turned flanges held in face-to-face relation by a plurality of two-ply tongues spaced longitudinally of the body and punched out of both flanges with roots spaced relatively closely to said longitudinal line and bent to lie closely against one of the flanges and extend in a direction transverse to said line with their free ends at or closely adjacent to the wall of the tube, the tongues having materially greater width from side edge to side edge than length from root to free end.

EVERETT P. LOPPACKER.